(12) United States Patent
Larsson

(10) Patent No.: US 8,331,990 B2
(45) Date of Patent: Dec. 11, 2012

(54) METHOD FOR ACTIVATING SIM CARDS

(75) Inventor: Thomas Larsson, Alvsjo (SE)

(73) Assignee: Giesecke & Devrient GmbH, Munich (DE)

(*) Notice: Subject to any disclaimer, the term of this patent is extended or adjusted under 35 U.S.C. 154(b) by 322 days.

(21) Appl. No.: 12/434,145

(22) Filed: May 1, 2009

(65) Prior Publication Data

US 2010/0210305 A1 Aug. 19, 2010

(30) Foreign Application Priority Data

Feb. 20, 2009 (SE) .................................. 0950077

(51) Int. Cl.
*H04M 1/00* (2006.01)
*H04B 1/38* (2006.01)

(52) U.S. Cl. .............. 455/558; 455/435.1; 455/433; 455/432; 455/550; 455/419; 455/405; 455/406; 455/418; 455/411; 370/352; 713/168

(58) Field of Classification Search .............. 455/558
See application file for complete search history.

(56) References Cited

U.S. PATENT DOCUMENTS

| | | | |
|---|---|---|---|
| 5,915,226 A * | 6/1999 | Martineau | 455/558 |
| 6,366,777 B1 * | 4/2002 | Uusitalo | 455/433 |
| 7,266,371 B1 * | 9/2007 | Amin et al. | 455/419 |
| 7,389,119 B2 * | 6/2008 | Weigele | 455/517 |
| 7,437,144 B1 * | 10/2008 | Andresen et al. | 455/405 |
| 2004/0176092 A1 * | 9/2004 | Heutschi | 455/435.1 |
| 2006/0058028 A1 * | 3/2006 | Allison et al. | 455/435.1 |
| 2006/0183500 A1 * | 8/2006 | Choi | 455/558 |
| 2006/0217106 A1 * | 9/2006 | Davidson et al. | 455/405 |
| 2007/0167161 A1 * | 7/2007 | Cheng et al. | 455/435.1 |
| 2008/0153547 A1 * | 6/2008 | Weigele | 455/558 |
| 2010/0136971 A1 * | 6/2010 | Holter et al. | 455/435.1 |

* cited by examiner

*Primary Examiner* — Kent Chang
*Assistant Examiner* — Benjamin Morales Fernandez
(74) *Attorney, Agent, or Firm* — Young & Thompson

(57) ABSTRACT

The ODA database (4) contains SIM card (1) information related to the cards that shall be activated. When a SIM card (1) is inserted into a mobile equipment, such as a mobile telephone, and the mobile equipment is switched on, the ODA (2) is connected to the SIM card for updating the SIM card with a card definition file. The ODA (2) is arranged to be connected to a HLR/AUC (5) in order to transfer information stored on the updated SIM card, and the HLR/AUC is arranged to set up a subscription for the SIM card.

20 Claims, 2 Drawing Sheets

Fig 2

| IMSI_T | ICCID | Ki | MSISDN_P | IMSI_P | STRATEGY_PROFILE | STATUS |
|---|---|---|---|---|---|---|
| 240089900000001 | 5432100000001 | Ki_1 | PROFILE | PROFILE | STRAT_PrePaid_20EUR_GOLD | Defined |
| 240089900000002 | 5432100000002 | Ki_2 | | | | Imported |
| 240089900000003 | 5432100000003 | Ki_3 | PROFILE | PROFILE | STRAT_PrePaid_00EUR | Defined |
| 240089900000004 | 5432100000004 | Ki_4 | 46733123432 | 240080207770002 | STRAT_PrePaid_00EUR | Provisioned |
| 240089900000007 | 5432100000007 | Ki_7 | 46733123462 | 240080207770007 | STRAT_PrePaid_MobileBroadband | Provisioned |
| 240089900000008 | 5432100000008 | Ki_8 | 46733123463 | 240080207770008 | STRAT_PrePaid_MobileBroadband | Defined |

| STRATEGY_PROFILE | PROFILE | SERVICE_ORDER | SIM_FILE_DATA | PROFILE_DATA | STRAT_MSISDN_P | STRAT_IMSI_P |
|---|---|---|---|---|---|---|
| STRAT_PrePaid_20EUR_GOLD | USIM_PrePaid_20EUR_GOLD | XML_PP20EUR | 0x12EF5643 | 20 EUR | MSISDN_P_POOL(GOLD) | IMSI_P_POOL(*) |
| STRAT_PrePaid_00EUR | USIM_PrePaid_00EUR | XML_PP00EUR | 0x8865346891 | 0 EUR | MSISDN_P_POOL(CITY) | IMSI_P_POOL(VLR) |
| STRAT_PrePaid_MobileBroadband | USIM_PrePaid_MobileBroadband | XML_MBB00EUR | 0x1200BC643 | 50 GBYTE | FORCED | FORCED |

| MSISDN_P | GROUP_ID |
|---|---|
| 46733123468 | CITY |
| 46733111111 | GOLD |
| 46733888888 | GOLD |
| 46733123470 | CITY |
| 46733123471 | CITY |

| IMSI_P | GROUP_ID |
|---|---|
| 240080207770017 | NORTH |
| 240080207770018 | NORTH |
| 240080207770019 | SOUTH |
| 240080207770020 | NORTH |

METHOD FOR ACTIVATING SIM CARDS

CROSS-REFERENCE TO RELATED APPLICATIONS

The instant Application claims priority to Swedish Application No. 0950077-8 filed Feb. 13, 2009.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION (1) Field of the Invention

The present invention refers to a method for activating SIM cards for use in mobile telephones.

(2) Description of Related Art

Every installed, inactive, subscription involving a SIM card generates license costs and other costs for resources consumed for the operators of mobile networks. This is also true for SIM cards not activated for some time or even cards that are not activated at all. This is especially true for cards that are used for prepaid mobile telephone services. Such cards, prepaid cards, are stored in large amounts at non-controllable point-of-sales locations, waiting to get sold. When manufactured, such a card is provided with information in order to make it possible to use the card immediately after that the card has been sold. Therefore, also the mobile telephone operator stores information related to each card in the operators HLR (Home Location Register) and AUC (Authentication Center), such as the cards IMSI (International Mobile Subscriber Identity).

The cost for an operator is dependent on the number of cards registered in the mobile system. Manufacturing, handling, logistics and storage of SIM cards also represents costs to the mobile operator. This cost increases significantly when the amount of different SIM card types that are handled by the operator increases.

It is thus essential to the mobile operator to keep the amount of different SIM cars types to a minimum, ideally to one type only.

A multinational operator can e.g. have several PLMNs (Public Land Mobile Network) within a region all having own SIM cards with own IMSI series and/or different MSISDNs which are the catalogue number, i.e. the telephone number depending on which geographical area the subscriber belongs to.

In certain countries the operator may even be obliged to be able to provide at any point of sale in the country, an applicable, usable SIM card to a subscriber who has lost or broken the SIM card. This implies major costs to the operators.

The present invention solves the problem of having many inactive subscriptions in the system by activating the SIM cards when the subscriber is going active for the first time.

BRIEF SUMMARY OF THE INVENTION

The present invention refers to a method of activating a SIM card using an ODA (On Demand Activation) application, comprising a computer and an associated ODA database, for activating the SIM card in a mobile network, characterised in that, the ODA database (4) contains SIM card (1) information related to the cards that shall be activated, in that, when a SIM card (1) is inserted into a mobile equipment, such as a mobile telephone, and the mobile equipment is switched on, the ODA (2) is connected to the SIM card for updating the SIM card with a card definition file, in that the ODA (2) is arranged to be connected to a HLR/AUC (5) in order to transfer information stored on said updated SIM card, and in that the HLR/AUC is arranged to set up a subscription for the SIM card.

BRIEF DESCRIPTION OF THE SEVERAL VIEWS OF THE DRAWINGS

The present invention is described in more detail below, partially with reference to drawings showing an exemplary embodiment of the invention, where FIG. 2 shows a table which is an example of data, relating to SIM cards that shall be activated, which data is stored in a database.

DETAILED DESCRIPTION OF THE INVENTION

Figure 1:
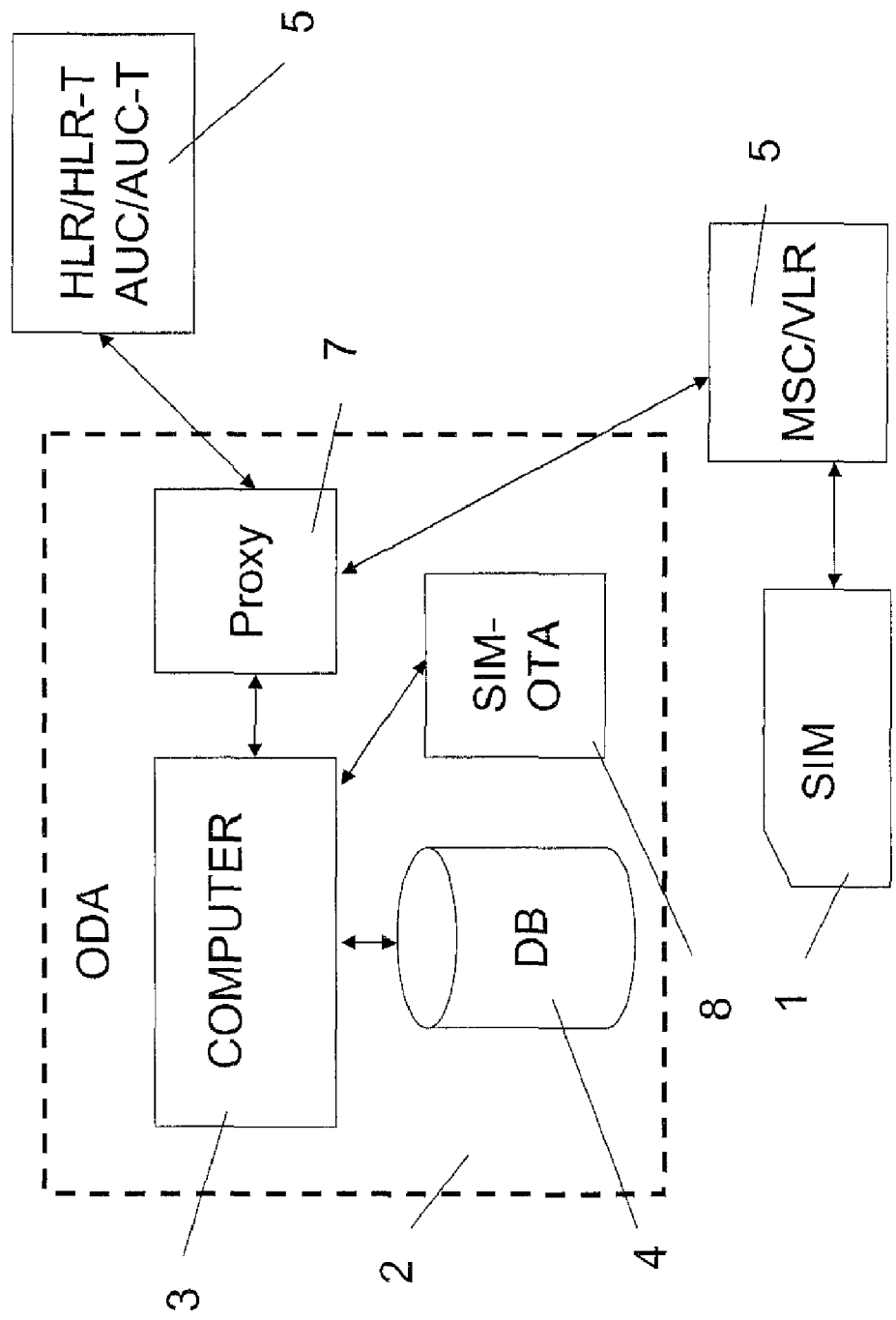
FIG. 1 shows a block diagram illustrating the present invention

Thus, the present invention relates to a method of activating a SIM card 1 using an ODA (On Demand Activation) database 2, comprising a computer 3 and an associated ODA database 4, for activating the SIM card in a mobile network.

According to the invention there is an ODA (On Demand Activation) application 2, where the ODA application comprises a computer 3, and a database 4, that contains SIM card 1 information related to the SIM cards that shall be activated using the ODA application. The SIM cards are generic profile SIM cards manufactured with temporary subscription data. Such SIM card will support several different subscriptions at the time of provisioning. Data is fed into the database 4 relating to said SIM card with temporary subscription data.

When the SIM card 1 is inserted into a mobile equipment, not shown, and the mobile equipment is switched on, the SIM card is connected to the ODA 2. The ODA 2 is arranged to be connected to a HLR/AUC 5, in order to set up a subscription for the card and to attach the SIM card 1 to the network using the HLR/AUC 5. ODA 5 will then update both the SIM and the network, including the HLR/AUC 5 with the final subscription data.

Thereafter, the mobile phone is ready for use. The ODA application 2 is also connected to a SIM-OTA platform 8 to be able to make OTA provisioning of the SIM card.

Thus, a point-of-sale sells the SIM card with said temporary subscription data, where after it is inserted in a mobile phone which is switched on. Thereafter, the present ODA application updates the SIM card with all necessary data, received from the ODA application, in order to make the mobile phone work, without the customer doing anything.

According to a preferred embodiment of the invention the ODA 2 is connected to a proxy, such as an SS7 SCCP Application 7 logically located between a HLR/AUC 5 and a MSC/VLR 5 (Mobile Services Switching Centre/Visitor Location Register). Further, the memory of the SIM cards 1 contains a code which, when a SIM card is inserted into a mobile equipment and the mobile equipment is switched on, a message is received by the Proxy 7, which Proxy is arranged to direct a message, containing said code, from the mobile phone via said MSC/VLR 5 to said ODA application.

According to a very much preferred embodiment of the invention, said code is a temporary IMSI (IMSI-T). However, the code for directing the signal to the Proxy could be another special code than IMSI-T.

Still further, according to a much preferred embodiment of the invention the SIM cards 1 thus includes said temporary IMSI (IMSI-T). Said ODA 2 comprises in its memory for each SIM card a IMSI-T and a card definition file. The IMSI-T received by the ODA from a SIM card matches with the IMSI-T in the database 4. As said above the ODA 2 comprises said Proxy 7 located between a HLR/AUC 5 and the mobile equipment. When a SIM card 1 is inserted in a mobile equipment and the mobile equipment is switched on, the said IMSI-T is sent to said Proxy 7, which is adapted by means of said IMSI-T to direct information in the memory of the SIM card 1 to the database 4 of the ODA 2. The SAI (Send Authentication Information) signal is then halted in the Proxy 7. The halted message can instead be a Map UL (Update Location) message.

Thereafter the IMSI-T is sent from the ODA 2 to a HLR-T/AUC-T (Temporary Home Location Register) of the mobile network. The HLR-T/AUC-T can be a separate HLR/AUC or it can be a part of a HLR/AUC in the network as illustrated in FIG. 1. Thereafter a temporary subscription based on the IMSI-T is created in the HLR-T/AUC-T, and the HLR-T/AUC-T sends information to ODA that IMSI-T is ready for use. After that the IMSI-T is ready for use the Proxy 7 switches the halted SAI signal to the HLR-T/AUC-T. Thereafter, a permanent IMSI (IMSI) together with additional information, such as MSISDN, subscription type, and a authentication key (Ki), billing information etc. is transferred from ODA 2 to said network, including a permanent HLR/AUC (HLR-P/AUC-P) and to the SIM card. Hereby the mobile equipment is ready for full use. Lastly the IMSI-T is deleted in the HLR-T/AUC-T.

In FIG. 2 the data in the ODA database 4 is exemplified. In the upper table there is stated a number of IMSI-T's. Further, for each IMSI-T a number of parameters such as ICCID (Integrated Circuit Card Identity), Ki, MISIDN, IMSI-P, Strategy Profile and status are stored in the database 4. At time of activation, subscription parameters are set based on business logic, selection criteria and available resource pools, e.g. MSISDN pool, as exemplified three other tables in FIG. 2.

It is apparent that the present invention is preferably used for SIM cards for prepaid telephone service. By means of the invention prepaid SIM cards can be made and stored without being designated to a certain operator or company. This means that it is enough that a point-of-sale only has one type of SIM card. Further, a purchased SIM card can be activated anywhere regardless of operator due to the interoperability of IMSI-T.

However, the present invention can also be used regarding post paid subscriptions.

The present invention thus solves the problem mentioned in the introduction and makes it possible to cut costs related to not sold SIM cards and the corresponding subscriptions.

The present invention has been described above exemplified with a GSM mobile system. However, the present invention can be used for other mobile telephone systems, such as 3G.

The present invention shall not be considered to be limited to the afore described embodiments, since variations can be made within the scope of the accompanying claims.

The invention claimed is:

1. A method of activating a SIM card in a mobile telephone network using an ODA (On Demand Activation) application that operates on a computer with an associated ODA database, the ODA database (4) containing SIM card (1) information related to SIM cards to be activated, said information being associated with a code in the ODA database, the ODA (2) including a proxy (7) logically located between a HLR/AUC (5) (Home Location Register/Authentication Center) and a MSC/VLR (6) (Mobile Services Switching Centre), and a memory of a SIM card (1) containing said code, the method comprising the sequential steps of:

in a first step, when the SIM card is inserted into a mobile equipment and the mobile equipment is switched on, a message related to a registration procedure containing said code is sent from the mobile equipment to said proxy (7) via said MSC/VLR;

in a second step, said message is halted in said proxy (7);

in a third step, said proxy (7) is arranged to direct a message, containing said code, to said ODA application (2,4);

in a fourth step, ODA (2) is connected to a HLR-T/AUC-T (Temporary Home Location Register/Authentication Center) in the mobile telephone network (5) in order to transfer information stored on said SIM card;

in a fifth step, HLR-T/AUC-T sends information to said ODA (2) which state that a temporary subscription is ready for use;

in a sixth step, said proxy (7) relays the halted message to said HLR-T/AUC-T (5);

in a seventh step, when said proxy (5) relays the halted message to said HLR-T/AUC-T (5), the ODA (2) is connected to the SIM-card in order to update the SIM-card with a card definition file including permanent subscription data; and in an eight step, the ODA (2) is connected to a HLR/AUC (5) in order to transfer information stored on said updated SIM card, whereby the HLR/AUC is arranged to set up a permanent subscription.

2. The method according to claim 1, wherein said code is a temporary IMSI (IMSI-T).

3. The method according to claim 2, wherein the SIM cards (1) to be activated include said temporary IMSI (IMSI-T), and wherein said ODA (2) stores, for each SIM card, (1) a IMSI-T and a card definition file.

4. The method according to claim 1, wherein, when said proxy (7) relays the halted message to said HLR-T/AUC-T (5), a permanent subscription together with additional information is caused to be provisioned by said ODA (2) in said or another network for permanent use, and wherein IMSI-T is deleted in HLR-T/AUC-T (5).

5. The method according to claim 2, wherein, when said proxy (7) relays the halted message to said HLR-T/AUC-T (5), a permanent subscription together with additional information is caused to be provisioned by said ODA (2) in said or another network for permanent use, and wherein IMSI-T is deleted in HLR-T/AUC-T (5).

6. The method according to claim 3, wherein, when said proxy (7) relays the halted message to said HLR-T/AUC-T (5), a permanent subscription together with additional information is caused to be provisioned by said ODA (2) in said or another network for permanent use, and wherein IMSI-T is deleted in HLR-T/AUC-T (5).

7. The method according to claim 4, wherein said temporary subscription based on said code, which comprises a temporary IMSI, IMSI-T, is created in the HLR-T/AUC-T (5).

8. The method according to claim 1, wherein the halted message is a MAP SAI (Send Authentication Information) message.

9. The method according to claim 2, wherein the halted message is a MAP SAI (Send Authentication Information) message.

10. The method according to claim 3, wherein the halted message is a MAP SAI (Send Authentication Information) message.

11. The method according to claim 4, wherein the halted message is a MAP SAI (Send Authentication Information) message.

12. The method according to claim 7, wherein the halted message is a MAP SAI (Send Authentication Information) message.

13. The method according to claim 1, wherein the halted message is a Map UL (Update Location) message.

14. The method according to claim 2, wherein the halted message is a Map UL (Update Location) message.

15. The method according to claim 3, wherein the halted message is a Map UL (Update Location) message.

16. The method according to claim 4, wherein the halted message is a Map UL (Update Location) message.

17. The method according to claim 1, wherein the SIM cards (1) are cards for prepaid telephone service.

18. The method according to claim 4, wherein the additional information includes any of an IMSI, MSISDN, type of subscription, an authentication key (Ki), and billing information.

19. The method according to claim 5, wherein the additional information includes any of an IMSI, MSISDN, type of subscription, an authentication key (Ki), and billing information.

20. The method according to claim 6, wherein the additional information includes any of an IMSI, MSISDN, type of subscription, an authentication key (Ki), and billing information.

* * * * *